E. E. QUIMBY.
Centrifugal Liquoring Apparatus.

No. 223,537. Patented Jan. 13, 1880.

UNITED STATES PATENT OFFICE.

EDWARD E. QUIMBY, OF ORANGE, ASSIGNOR TO F. O. MATTHIESSEN & WIECHERS SUGAR REFINING COMPANY, OF JERSEY CITY, N. J.

CENTRIFUGAL LIQUORING APPARATUS.

SPECIFICATION forming part of Letters Patent No. 223,537, dated January 13, 1880.

Application filed June 11, 1879.

*To all whom it may concern:*

Be it known that I, EDWARD E. QUIMBY, of Orange, New Jersey, have invented certain Improvements in Centrifugal Liquoring Apparatus, (Case No. 3,) of which the following is a specification.

My improvements relate to that class of devices for conducting the white-liquor from the central reservoir of a centrifugal machine into the sugar contained in the molds, without permitting any of such liquor to escape outside of the molds, in which movable liquoring-boxes are employed, the liquoring-boxes having open outer faces which are provided with gaskets conforming in size and shape with the inner open faces of the molds; and my invention consists in connecting each of such boxes with the central reservoir by a tube of elastic material which will stretch to allow the box to be driven outward by centrifugal force sufficiently to compress its gasket upon the inner edges of the top, bottom, and sides of the mold, and has sufficient contractile force to pull the liquoring-box back from the mold when the machine is stationary.

The boxes are arranged in a circle between the molds and the rim of the central reservoir, which is provided with short nozzles, to which the inner ends of the elastic tubes are respectively fastened.

In operation, when the machine has acquired sufficient speed of rotation to cause the packing of the boxes against the molds white-liquor is introduced into the central reservoir, and is driven therefrom by centrifugal force through the elastic tubes into the boxes, and thence into the sugar contained in the several molds.

Figure 1:
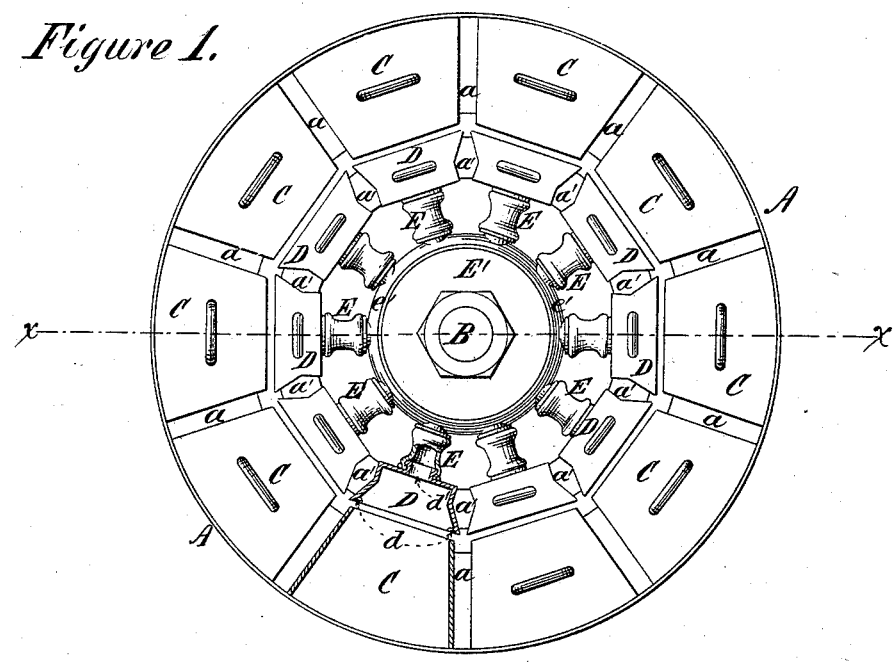
Figure 2:
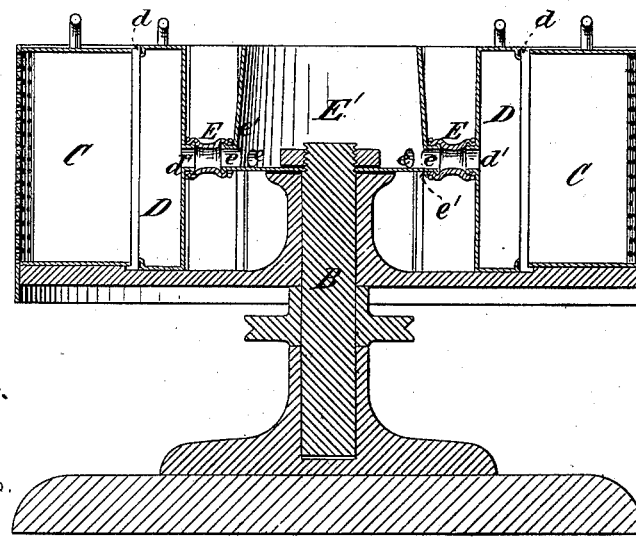

The accompanying drawings, representing a centrifugal machine containing my invention, are as follows: Figure 1 is a top view. Fig. 2 is a central vertical section through the line *x x* on Fig. 1.

The drawings represent the basket A of a centrifugal machine, mounted on the usual spindle B, and provided with vertical partitions or posts *a*, for equidistantly separating the molds C, concentrically arranged in the outer portions of the basket, and also provided with vertical posts or walls *a'*, for guiding the movements of the liquoring-boxes D in radial paths respectively.

The open outer faces of the liquoring-boxes are provided with the usual gaskets *d*, of elastic material.

The inner vertical wall of each liquoring-box has a projecting nozzle, *d'*, which is connected, by means of the elastic tube E, with the short nozzle *e*, projecting radially outward from the rim *e'* of the central chamber, E'. The elastic tube E forms, substantially, a flexible extension of the liquoring-box, which connects the box with the central chamber, E'.

When the centrifugal machine is rotated the effect of centrifugal force is to drive the liquoring-boxes radially outward and compress their gaskets against the molds respectively, and tight passages are thus afforded for conducting the white-liquor from the central chamber into the sugar contained in the molds without allowing any portion of it to escape outside the molds.

When the machine ceases to rotate, the boxes, being freed from the influence of centrifugal force, yield to the contractile force of their flexible extensions, and are drawn inward away from the molds, which may then be easily removed and others substituted in their places.

I do not herein claim, broadly, a series of liquoring-boxes loosely contained in the basket of a centrifugal machine, or flexibly connected therewith, whereby centrifugal force acts to throw them outward against a like series of sugar-molds, or gravity acts to tilt them convergently inward, away from the sugar-molds, as such boxes are the invention of F. O. Matthiessen, and are made the subject of claim in his application for a patent filed May 9, 1879, designated "Case A."

I claim as my invention—

A series of sugar-molds concentrically arranged in the basket of a centrifugal machine, in combination with an inner circle of radially-movable liquoring-boxes, each having a flexible tubular connection with a central reservoir, substantially as and for the purpose set forth.

EDW. E. QUIMBY.

Witnesses:
M. L. ADAMS,
GEO. W. MIATT.